United States Patent [19]
Aoyama et al.

[11] Patent Number: 5,798,494
[45] Date of Patent: Aug. 25, 1998

[54] WELDING APPARATUS

[76] Inventors: Yoshitaka Aoyama; Shoji Aoyama, both of 20-11, Makitsukadai 2-cho, Sakai-shi, Osaka 590-01, Japan

[21] Appl. No.: 744,833

[22] Filed: Nov. 6, 1996

[30] Foreign Application Priority Data

Jun. 24, 1996 [JP] Japan ............................ 8-199518

[51] Int. Cl.$^6$ ............................................. B23K 9/20
[52] U.S. Cl. ............................................. 219/98
[58] Field of Search ............................ 219/98, 99

[56] References Cited

U.S. PATENT DOCUMENTS

| | | | |
|---|---|---|---|
| 3,293,402 | 12/1966 | Graham | 219/98 |
| 3,723,700 | 3/1973 | Ettinger | 219/98 |
| 5,384,445 | 1/1995 | Nakagami | 219/98 |
| 5,426,276 | 6/1995 | Gauger | 219/98 |
| 5,688,414 | 11/1997 | Kondo | 219/98 |

FOREIGN PATENT DOCUMENTS 0338563  10/1989  European Pat. Off. ............ 219/98

*Primary Examiner*—Clifford C. Shaw
*Attorney, Agent, or Firm*—Pollock, Vande Sande & Priddy

[57] ABSTRACT

A retractable feeding rod is located in a guide cylinder. A workpiece retaining pipe is connected to a leading end of the guide cylinder which serves as a movable electrode and a feed-in passage for a workpiece positioned at an acute angle to the guide cylinder. It opens within the guide cylinder and a control surface is provided for appropriately regulating the advancing speed of the workpiece in an end or in the middle of a passage through which the workpiece is fed to the guide cylinder to prevent the guide cylinder from being damaged or worn by the workpiece that impacts the guide cylinder at a high speed.

12 Claims, 3 Drawing Sheets

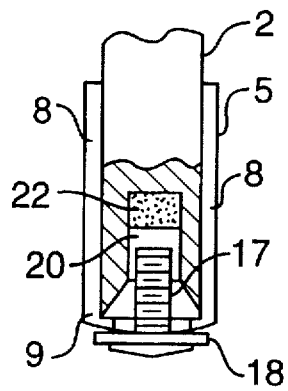
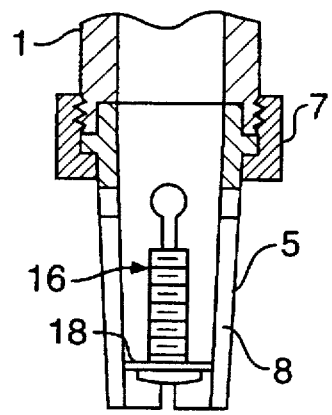
FIG. 5  FIG. 6
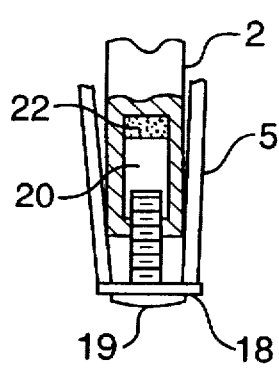
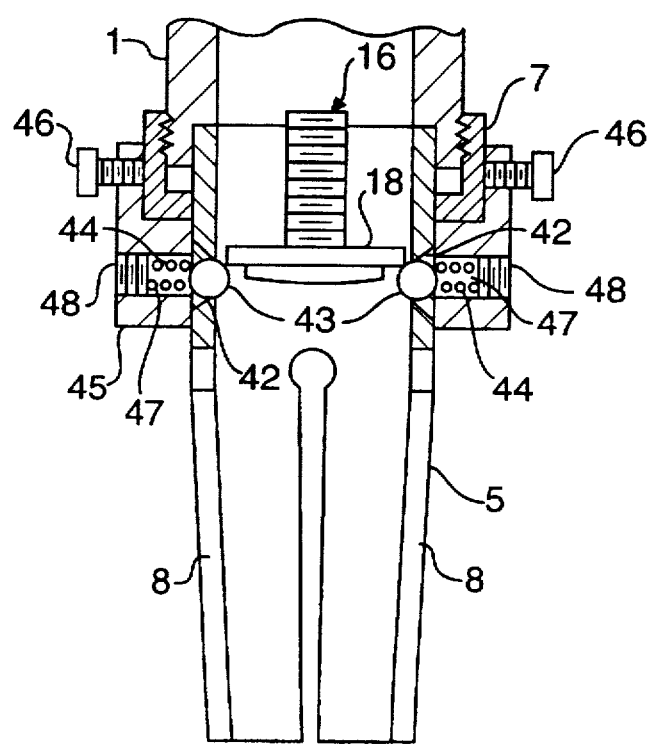
FIG. 7  FIG. 8

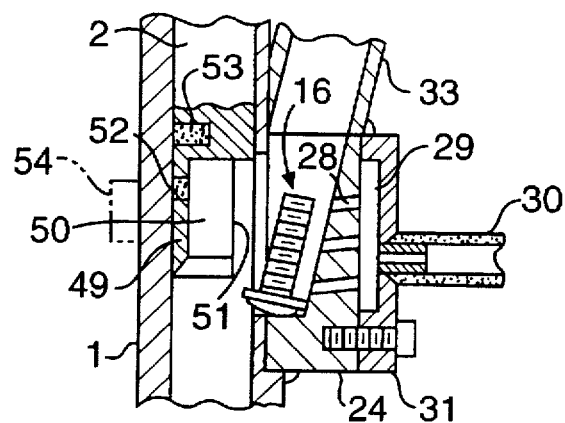 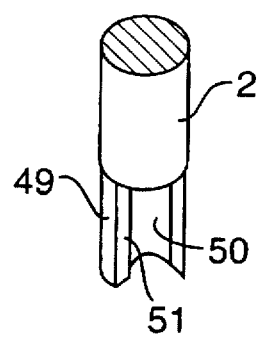
FIG. 9     FIG. 10
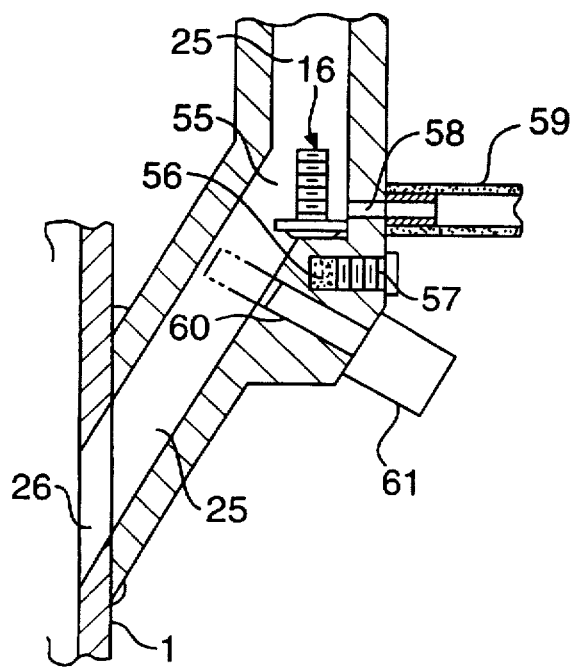 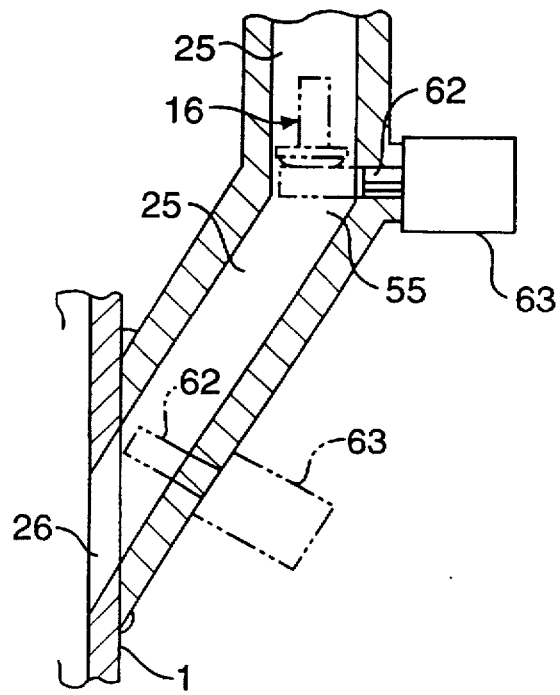
FIG. 11     FIG. 12

WELDING APPARATUS

BACKGROUND OF THE INVENTION

1. Field of the Invention

The present invention relates to a technical field of welding apparatus of such type that a retractable feeding rod is provided in a guide cylinder, a workpiece retaining pipe functioning as a movable electrode is connected to a leading end of the guide cylinder, and a feed-in passage for the workpiece is employed at an acute angle to the guide cylinder, and opens into the guide cylinder.

2. Prior Art

FIG. 1 shows an embodiment according to the invention, and is made use of for explaining the prior art. An apparatus shown in the figure is a stud welding machine or projection welding machine, wherein a feeding rod 2 is slidably inserted to a guide cylinder having a circular section, and the feeding rod 2 is connected by means of a bolt 4 to a piston rod 3 of an air cylinder that is coupled with the guide cylinder 1, although it is not shown in the figure. A workpiece retaining pipe 5 is connected to a leading end of the guide cylinder 1. The pipe is made of a special steel, and the guide cylinder 1 and retaining pipe 5 are integrally joined by inserting an end of the retaining pipe 5 into the guide cylinder, and fastening a cap nut 7 to a threaded portion 6. The retaining pipe 5 is provided with a plurality of sections 8 split in the axial direction, and a retaining projection 9 is employed in an end of the retaining pipe 5 in the inside thereof. The retaining pipe 5 functions as a movable electrode for allowing a welding current to flow to the workpiece, when the entire guide cylinder 1 is moved forward.

A feed-in hole 10 shown in a two-dot chain line is formed in the guide cylinder 1 in accordance with a conventional structure. A feeding hose 11 is connected to the feed-in hole 10. A bracket 12 is welded to the guide cylinder 1, and a piston rod 14 of an air cylinder 13 is coupled to the bracket 12. Then, the air cylinder 13 is fixed to a stationary member 15, so that the entire welding machine is moved forward and backward in the direction of the axis of the guide cylinder 1 by an output from the air cylinder 13. The workpiece referred to in the specification is an iron bolt 16 having an axial portion 17 and a flange 18 with a protrusion 19 formed as a weld metal zone in the flange 18.

Further, according to another example of prior art, instead of providing the retaining projection in the inside, the retaining pipe 5 is tapered such that the flange 18 of bolt is temporarily held by the inner surface of retaining pipe 5, as shown in FIGS. 6 and 7 (illustrating embodiments of the invention, which are, however, used for explaining the prior art).

In the apparatus described above, although the bolt 16 is fed to the guide cylinder 1 through the feed-in hole 11, and drops naturally until it is stopped as the flange 18 is abutted to the retaining projection 9, it is a problem in terms of durability that the retaining function of retaining projection 9 is reduced as it is gradually worn or broken, in the worst case, by the impact of a bolt. Generally, the impact to the retaining projection 9 is significantly increased in a workpiece such as a bolt, because it is transported at a high speed in the feeding hose by air injection, and such problem as wear is rendered more importance.

Also, in the case of the embodiment shown in FIG. 6, as the inner surface of retaining pipe 5 holds the flange 18 against such high speed of transportation, it is a problem that the inner surface of retaining pipe 5 is worn only in that portion, thus normal operation of the temporary retention may be consequently affected, or the flange 18 cannot smoothly slide within the retaining pipe 5.

SUMMARY OF THE INVENTION

The invention has been derived in view of solving the problems described above, and provides a welding apparatus characterized by a retractable feeding rod that is provided in a guide cylinder. A workpiece retaining pipe functions as a movable electrode and is connected to a leading end of the guide cylinder. A feed-in passage for the workpiece is employed at an acute angle to the guide cylinder, and opens into the guide cylinder, wherein a control surface for appropriately regulating a feed-in speed of the workpiece is formed in an end of the feed-in passage. The impact of a workpiece to the retaining projection 9 of retaining tube 5 or tapered inner surface of the retaining tube 5 is reduced by temporarily stopping or significantly decelerating the workpiece that is moved through the feed-in passage at the control surface.

The invention provides a welding apparatus, wherein means for transferring the workpiece into the guide cylinder is provided in the vicinity of an end of the feed-in passage, and a force toward the guide cylinder is applied to the workpiece within the feed-in passage, thus the workpiece is transferred smoothly to the guide cylinder.

The invention provides a welding apparatus, wherein a leading end of the feeding rod has a open portion in the form of a trough, which faces an opening of the feed-in passage, and is provided with means for holding the workpiece at the leading end of the feeding rod, and the workpiece received by the control surface is transferred directly to the guide cylinder, contained in the open portion, and simultaneously held within the open portion to avoid dropout from the open portion.

The invention provides a welding apparatus, wherein a temporary retention means is formed by resiliently supporting a member that is projected into the guide cylinder or retaining pipe, and the temporary retention is achieved in the form of a resilient projection in a location other than the leading end of the retaining pipe.

The invention alternatively provides a welding apparatus, wherein a temporary retention means is formed by reducing the inner diameter of the retaining pipe at or in the vicinity of the leading end of retaining pipe. The workpiece is reduced in speed and is temporarily retained by such portion of a smaller diameter of the retaining pipe.

The invention provides a welding apparatus characterized by a retractable feeding rod that is provided in a guide cylinder, a workpiece retaining pipe functioning as a movable electrode is connected to a leading end of the guide cylinder, and a feed-in passage for the workpiece is employed at an acute angle to the guide cylinder, and opens into the guide cylinder. A control surface for appropriately regulating a feed-in speed of the workpiece is formed in the middle of the feed-in passage, the control surface achieves an operation similar to that already described, and the workpiece is passed through the feed-in passage to the guide cylinder.

The invention provides a welding apparatus, wherein the feed-in passage is curved, and the control surface is formed in the curved portion, so that the control surface is formed by making use of the curved portion to appropriately regulate the feed-in speed in a similar manner as that described above.

The invention provides a welding apparatus, wherein the control surface is provided in the vicinity of an opening of the feed-in passage. The workpiece is fed to the guide cylinder after the feed-in speed is appropriately regulated.

BRIEF DESCRIPTION OF THE DRAWINGS

FIG. 5 is a partial longitudinal section showing a feeding rod in an advanced state.

FIG. 6 is a partial longitudinal section showing an alternative embodiment.

FIG. 7 is a partial longitudinal section showing a bolt held in the embodiment of FIG. 6.

FIG. 8 is a partial longitudinal section of still another embodiment.

FIG. 9 is a partial longitudinal section of a further embodiment.

FIG. 10 is a partial three-dimensional view showing the leading end of a feeding rod in the embodiment of FIG. 9.

FIG. 11 is a partial longitudinal section showing a still further embodiment.

FIG. 12 is a partial longitudinal section showing even other embodiment.

DESCRIPTION OF THE PREFERRED EMBODIMENTS

Figure 1:
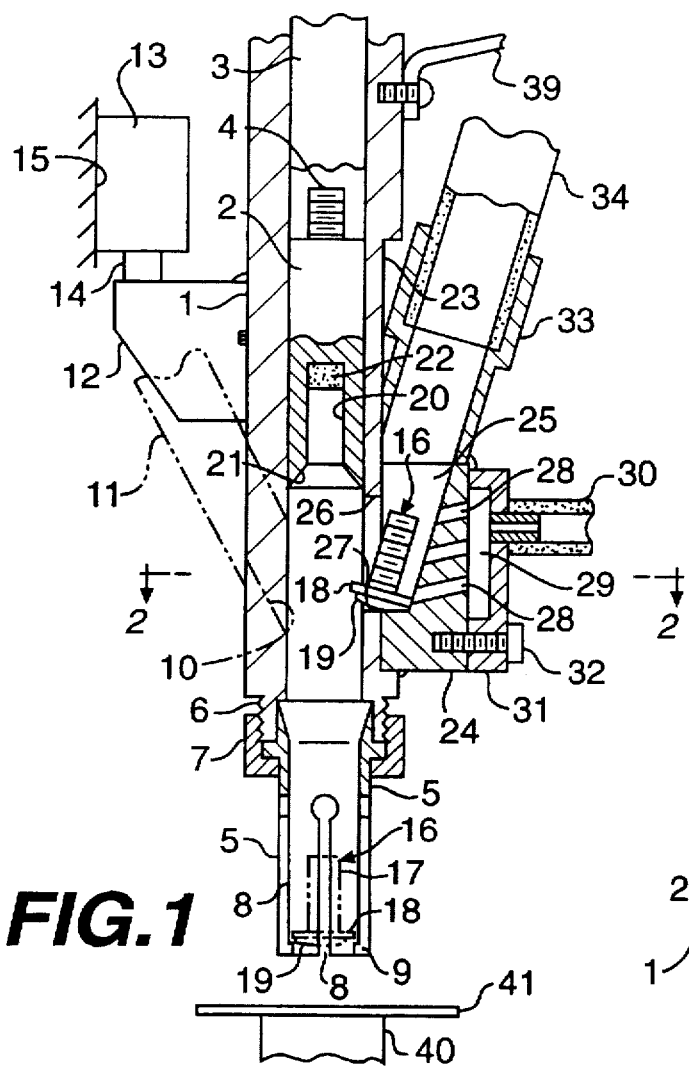
FIG. 1 is a longitudinal section showing an embodiment of the invention.

Now, the mode for carrying out the invention is described according to embodiments shown in the figures. Since components except the feed-in hole 10 and feeding hose 11 form a part of the embodiments according to the invention, the embodiments are described additionally to the description above.

A receiving hole 20 is provided in a feeding rod 2, and a tapered portion 21 is formed in an opening thereof. A workpiece retaining means is employed in the receiving hole 20. However, various alternative means may be used, such as a plate spring exposed to an inner surface of the retaining hole 20 for clamping the workpiece by means of a spring force of the plate spring and a steel ball similarly exposed to an inner surface of the receiving hole 20, and supported by a coil spring for resiliently holding the workpiece by the steel ball. A magnet (permanent magnet) can be taken as the simplest example here. The magnet is depicted by numeral 22, and is fitted to the deepest part of the receiving hole 20.

A planar portion 23 is formed by removing an outer surface of the guide cylinder 1, and a block 24 approximately shaped in a rectangular parallelepiped is welded to the planar portion. The block 24 is formed with a feed-in passage 25 for the workpiece, which is in communication with an opening 26 in the planar portion 23. In an end of the feed-in passage 25, a control surface 27 for appropriately regulating a feed-in speed of the workpiece is formed. The control surface 27 provides a planar surface formed by a surface in the opening 26 and a surface in the block 24 that are smoothly contiguous to each other, as clearly shown in FIGS. 1 and 2, and is more preferably subjected to a heat treatment in consideration of wear due to an impact of the workpiece. Instead of being planar, the control surface may be concave in the case the bolt 16 is made of iron. As means for smoothly transferring the workpiece from the passage 25 to the guide cylinder 1, air injection is employed. It comprises an injection nozzle 28 formed in the block 24 toward the passage 25, a distribution chamber 29 communicating with the injection nozzle 28 and an air hose 30 opening to the distribution chamber 29. To constitute the distribution chamber 29, a thick plate 31 is fixed to the block 24 by a bolt 32, and the distribution chamber 29 of a concave shape is formed in the thick plate 31. To facilitate understanding, the bolt 6 is not shown in FIG. 2.

A joint pipe 33 communicating with the passage 25 is welded to an upper part of the block 24, and a feeding hose 34 from a workpiece feeder not shown is connected to the joint pipe 33. As clearly shown in FIG. 1, the joint pipe 33 and the feed-in passage 25 are aligned, and an axis thereof is intersected by an axis of the guide cylinder 1 at an acute angle. In other words, the feed-in passage 25 and the guide cylinder 1 are positioned at an acute angle to each other.

Numeral 39 shows a cable connected to the guide cylinder 1 for supplying a welding current, a fixed electrode 40 is placed coaxially with the retaining pipe 5, and a steel plate workpiece 41 to which the bolt is welded is placed on the fixed electrode. Although proper insulation is provided to prevent the current in the cable 39 from flowing to an unwanted part, it is not shown in the figure.

Figure 2:
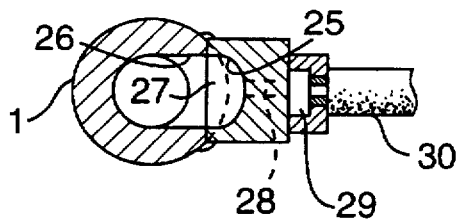
FIG. 2 is a sectional view along line (2)—(2) of FIG. 1.

In operation of the embodiments of FIGS. 1 and 2, the bolt 16 transported at a high speed through the feeding hose 34 is passed to the passage 25, and abutted against the control surface 27. Then, the bolt is continuously transferred to the guide cylinder 1 by means of air from the injection nozzle 28, drops to the retaining pipe 5, and is stopped as the flange 18 is engaged by the retaining projection 9. When the feeding rod 2 is lowered, the axial portion 17 is received relatively by the receiving hole 20, and subjected to an attractive force of the magnet 22. Then, as a leading end of the feeding rod 2 comes in contact with the flange 18, and further pushes it downward, the flange 18 is forcibly pressed against the retaining projection 9, allows the leading end of retaining pipe 5 to resiliently open, the advance movement of feeding rod 2 is discontinued as the flange 18 passes the retaining projection, and a state shown in FIG. 5 is obtained. When the entire apparatus including the guide cylinder 1 and retaining pipe 5 is lowered by operation of the air cylinder 13, the protrusion 19 of bolt 16 is pressed against the steel plate workpiece 41, and an electric current is supplied from the cable 39, the current flows through the guide cylinder 1 and retaining pipe 8 to the flange 18, steel plate workpiece 41 and fixed electrode 40, and projection welding by an electric resistance is completed.

In achieving stud welding alternatively to the projection welding, by supplying a welding current after the protrusion 19 is stationary placed in immediate proximity of the steel plate workpiece 41, and generating an arc in that location, a melting part is formed in the protrusion and steel plate workpiece, then the flange 18 is pressed against the steel plate workpiece, and the welding is completed. In such case, although a shield gas is employed, structures required for it are not shown.

When the advancing direction of the workpiece is inclined in relation to the control surface 27, as shown in FIG. 1, because the bolt 16 abutted against the control surface 27 is subjected to a force acting in the left direction, supply of air from the injection nozzle 28 may be at a lower rate, or even discontinued. Even when the bolt 16 temporarily retained within the retaining pipe 5 is inclined, and an end of the axial portion 17 comes in contact with the inner surface of retaining pipe 5, because the tapered portion 21 is provided in the receiving hole 20 of the feeding rod, the axial portion 17 is received by the receiving hole 20 in such manner that it is guided to an upright position by the tapered portion 21.

Figure 3:
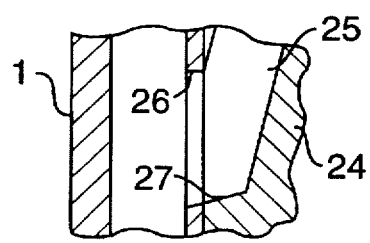
FIG. 3 is a partial longitudinal section showing another embodiment.

In order to increase the force in the left direction, the control surface should be inclined as shown in FIG. 3. In such case, the means for transferring the workpiece to the guide cylinder can be eliminated.

Although examples of the control surface shown in FIGS. 1 and 3 are for reducing the speed of bolt without stopping its movement as it is abutted thereto, since the control surface 27 is inclined in the direction perpendicular to the advancing direction of the workpiece, that is, opposite to that of FIG. 3, the bolt 16 is temporarily stopped at the control surface 27. Thus, in the embodiment, an air cylinder 35 is attached to the block 24, and the bolt 16 is transferred to the guide cylinder 1 by forward movement of a piston rod 36 of the cylinder.

Figure 4:
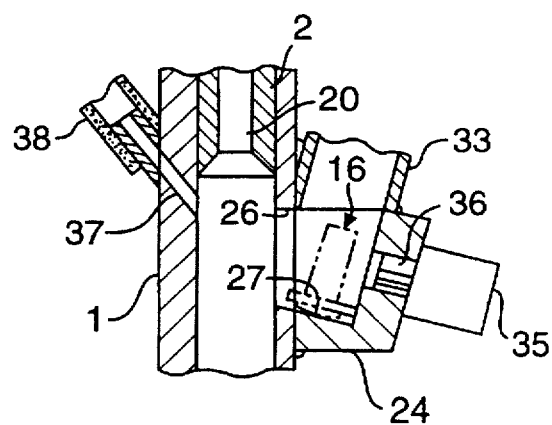
FIG. 4 is a partial longitudinal section showing the other embodiment.

In the embodiments described, although the apparatus is positioned in such manner that it allows the workpiece to drop, when the guide cylinder and retaining pipe are positioned horizontally or almost horizontally, an air injection nozzle 37 shown in FIG. 4 is opened inside the guide cylinder 1, so that the workpiece transferred to the guide cylinder 1 can be immediately transported toward the retaining pipe 5 by means of air ejected from the injection nozzle 37. In such case, the passage 25 is located in the lower side, and the control surface 27 is allowed to provide a predetermined function.

Because a structure for insulation of the welding current can be readily achieved in a known manner, as already described, it is not shown in the figures. Also, an air hose to be connected to the air cylinder is not shown, and a sequence required for operation can be easily carried out by using known electromagnetic air valve and control circuit.

In embodiments of FIGS. 6 and 7, the retaining pipe 5 has no retaining projection as shown in FIG. 1, and is tapered, that is, the diameter of the retaining pipe 5 is generally reduced toward the leading end thereof, so that the bolt is decelerated by the control surface 27, and stopped as the flange 18 comes in contact with the inner surface of the retaining pipe 5. When the feeding rod 2 is lowered, the axial portion 17 is received relatively by the receiving hole 20, and the leading end of feeding rod 2 contacts the back side of flange 18. As the feeding rod 2 is further lowered, the flange 18 pressure-opens the retaining pipe 5 and is stopped when it comes out of the pipe to a position slightly lower than the tip of retaining pipe 5, then, when the feeding rod 2 is slightly retracted, a state shown in FIG. 7 is obtained, and the bolt 16 is held at a position in FIG. 7 by means of an attractive force of the magnet 22.

Although the retaining pipe 5 is either provided with the retaining projection 9 in an end thereof or tapered in the embodiments described above, in an embodiment shown in FIG. 8, a steel ball is resiliently supported by allowing a projecting member, for example, a part of the steel ball to be exposed within the retaining pipe 5 or guide cylinder 1. Specifically, four tapered holes 42 are provided at a regular interval in the circumferential direction in the retaining pipe to the upper side thereof, steel balls 43 are respectively fitted to the holes such that they are partially projected within the retaining pipe 5, and a spring force is applied to the steel ball 43 by a coil spring 44. For that purpose, an annular member 45 is fixed to the cap nut 7 by a bolt 46, the coil spring 44 is housed by a hole 47 provided in the diametrical direction of the annular member 45, and a plug bolt 48 is employed for preventing the coil spring 44 from being displaced.

When the bolt 16 comes down through the guide cylinder 1 at a moving speed controlled by the control surface 27, it is temporarily stopped as the flange 18 is caught by four steel balls 43 that is projected. Then, the feeding rod 2 is lowered, the flange 18 forces the steel balls 43 to retract, and welding is thereafter achieved in a same procedure as described above.

Although the feeding rod described above is formed with the receiving hole 20, in embodiments of FIGS. 9 and 10, the leading end of feeding rod is in the shape of a trough, the bolt 16 is moved in the diametrical direction of feeding rod 2, and the axial portion 17 is held by the feeding rod 2. In other words, a trough-shaped portion 49 is formed by cutting away the leading end of feeding rod 2 in such manner that a concave groove 50 is formed, and an open portion 51 thereof is faced to the opening 26 of feed-in passage. Means for holding the workpiece is provided in the trough-shaped portion 49. For such an arrangement, it is the simplest way to provide magnets 52, 53 embedded in the leading end of feeding rod 2 as shown in the figures, and positions of the magnets are selected such that the bolt 16 is attracted into the trough, and drawn in the upper direction of the feeding rod 2. For reinforcement of the attractive force, a magnet 54 may be attached to the guide cylinder 1 as shown in two-dot long and two short dashes line. Since other parts of the embodiment are constructed in a similar manner as those of FIG. 1, they are shown by same numerals, and not described in detail here. In positioning the magnets, it is important to locate them to the upper side of the concave groove 50 and remote from the open portion 51, so that the bolt 16 is subjected to a drawing force in the upper direction, the back side of flange 18 comes in contact with the leading end of feeding rod 2, and relative positioning between the feeding rod and bolt is established.

When the bolt 16 is transported downward through the feed-in passage, received by the control surface 27, then transferred to the guide cylinder by air from the injection nozzle 28, the axial portion 17 of bolt 16 is drawn into the trough-shaped part 49 through the opening 26 by attractive forces of the magnets 52, 53. Then, because of the attracting direction of magnet 53, the bolt 16 is drawn upward, and the flange consequently comes in contact with the leading end of feeding rod 2.

Now, in an embodiment shown in FIG. 11, a control surface 27 is located in the middle of the feed-in passage 25, the feed-in passage 25 is practically curved at a curved portion 55, and the control surface 27 is formed in that portion as shown in the figure. In the embodiment, a magnet 56 is embedded below the control surface 27, and fixed by a bolt 57 from outside. In order to transport the bolt 16 that is stationarily supported on the control surface 27 toward the opening 26, an injection nozzle 58 for compressed air is provided, and an air hose 59 is connected to the nozzle. A retractable control member 60 is employed slightly downstream the control surface, and comprises a piston rod of air cylinder 61 located outside. The control surface 27 is positioned as closely to the opening 26 as possible to prevent the bolt 16 to be fed at an excessively high speed after it is removed from the control surface 27.

Operation of the embodiment is such that the bolt 16 moving down through the feed-in passage 25 is received by the control surface 27, and adhered to the control surface by means of the attractive force of magnet 56. Then, when compressed air is applied to the bolt 16 from the injection nozzle 58, the bolt 16 is removed from the control surface 27 in a sliding motion, transported down through a downstream part of the feed-in passage 25, and enters the guide cylinder 1 through the opening 26. The control member 60 is for temporarily retaining the bolt 16 after it is removed from the control surface 27, temporarily retains the bolt when it is projected as shown in a two-dot long and two dashes line, and controls supply of the bolt according to a welding cycle. If such control is not required, the control member 60 may be eliminated. Additionally, the magnet 56 may be also eliminated, if the bolt 16 is moved downward at a moderate speed.

In an embodiment of FIG. 12, instead of providing a control surface in the feed-in passage 25 that is a stationary member, a retractable control member 62 is employed for appropriately regulating a transportation speed of workpiece, and a piston rod of air cylinder 63 located outside serves as the control member. Although such control member 62 is placed in the curved portion 55 of feed-in passage 25, it may be positioned immediate proximity of the opening 26 as shown in a two-dot long and two dashes line.

The bolt 16 is temporarily retained by the control member 62 as shown by the two-dot long and two dashes line, and its down-movement speed is appropriately regulated.

As described with respect to the embodiments, according to the invention, because the workpiece is either temporarily stopped at the control surface, or the moving speed is reduced by the control surface, it is transported to the retaining pipe at such appropriate speed that wear and damage of the retaining pipe can be avoided, and a durability of the retaining pipe can be thus improved. Specifically, the retaining projection and tapered inner surface of the retaining pipe are prevented from being excessively worn and damaged. Further, as the passage for leading the workpiece to the guide cylinder is positioned at an acute angle to the guide cylinder so that the passage is extended along the guide cylinder, by providing the control surface in an end thereof, a distance from the passage to the guide cylinder is minimum, and quick transfer of the workpiece can be smoothly achieved. Moreover, since the guide surface is arranged by making use of the acutely angled portion, the control surface itself can be readily provided in terms of spatial requirement.

Because means for transferring the workpiece to the guide cylinder is employed in the vicinity of an end of the feed-in passage, transfer of the workpiece to the guide cylinder after it is reduced in speed is assured, and highly reliable operation is achieved.

Since the leading end of feeding rod is provided with the trough-shaped open portion, the open portion is faced to the opening of feed-in passage, and means for holding the workpiece is employed in the leading end of feeding rod, the workpiece reduced in speed by the control surface is moved in the diametrical direction of the guide cylinder, immediately received by the trough-shaped portion, and quick transfer is assured.

As the temporary retention means is a member projecting inside the guide cylinder or retaining pipe, and resiliently supported, the temporary retention means can be placed at a predetermined position, that is, an optimum position, and advancing operation of the feeding rod can be optimized.

Even when the inner diameter of retaining pipe is reduced, that is, the workpiece is temporarily retained either by the retaining projection or inner surface of the tapered part, a high durability as temporary retention means can be assured.

In the case provision of the guide cylinder in combination with the feed-in passage is limited due to an available space, a joint between the feed-in passage and guide cylinder can be in a simple structure by providing the control surface in the middle of the feed-in passage. By providing the control surface in the curved portion of feed-in passage, a problem related to an available space can be overcome, because the control surface is located away from the guide cylinder as shown in FIG. 11.

Since the control surface is placed in the vicinity of the opening, the workpiece removed from the control surface is prevented from being transported at an excessively high speed, and the intended object is achieved.

Particular effects of constitution of the embodiments are listed below. Because the receiving hole for the workpiece is formed in the feeding rod, and means for holding the workpiece is provided in the hole, even when the workpiece is fed downward, unintentional dropout of the workpiece is prevented, which is effective for accurate feeding. By utilizing air injection as means for transferring the workpiece to the guide cylinder, a force required for transfer can be applied to the workpiece without causing any change in shape of the feed-in passage, which is very advantageous in terms of structure. In the embodiment having the trough-shaped portion in the leading end of feeding rod, by selecting positioning of the magnets in such manner that the bolt is drawn in the backward direction of the feeding rod, relative positioning between the bolt and leading end of the feeding rod can be accurately set as described above.

In the case an apparatus according to the invention is utilized specifically as a stud welding machine, while a retaining pipe as illustrated is generally employed, a durability in resilient operation, wear resistance or heat resistance of the retaining projection and the like are required for the retaining pipe, although such problems that are related to resiliency and heat resistance can be solved by improvement of a material, that of wear has been difficult to be solved because the transferring speed of the workpiece is significantly high, and a mass of the workpiece is increased, nevertheless a stud welding machine of high durability can be provided by reducing the transferring speed of the workpiece, and appropriately regulating it according to the invention. In the case the invention is utilized for projection molding a flanged bolt, since welding can be achieved by pressing the back side of flange by means of the leading end of the retaining pipe, abutting the protrusion to be welded of the flange to the steel plate workpiece that is a counter workpiece, and supplying an electric current thereto, feeding of the bolt to the retaining pipe and abutment of the flange by means of the retaining pipe can be carried out by sequential operations, and efficient and accurate projection welding can be achieved.

By providing the control surface in the curved portion, and employing the magnets in the vicinity thereof, provision of the control surface is facilitated, and the workpiece can be securely retained on the control surface. Specifically, because the control surface, magnets, retractable control member and the like are collectively located in the curved portion, they can be arranged neatly away from the guide cylinder, and desirable connection between the guide cylinder and feed-in passage can be achieved.

We claim:

1. A welding apparatus comprising:

a guide cylinder;

a retractable feeding rod axially positioned in the guide cylinder;

a workpiece retaining pipe connected to an outward end of the guide cylinder;

a feed-in passage for supplying workpieces to the guide cylinder and positioned at an acute angle with respect to the guide cylinder to form an intersection therewith;

the feed-in passage communicating with an interior of the guide cylinder, the feed-in passage further having a) control surface means formed in an internal wall of the feed-in passage, at an outward end thereof, for intercepting a supplied workpiece and arresting its motion prior to entering the retaining pipe; and b) an opening formed in the guide cylinder at the intersection to allow passage of a workpiece therein from the feed-in passage.

2. A welding apparatus as set forth in claim 1 further comprising means located at an exit end of the feed-in passage for forcing displacement of the workpiece to the guide cylinder.

3. A welding apparatus as set forth in claim 1 wherein a driving end of the feeding rod has a channel axially formed therein that faces the opening for receiving and embracing the workpiece.

4. A welding apparatus as set forth in claim 1 further comprising resilient means located downstream of the opening to temporarily retain the workpiece.

5. A welding apparatus as set forth in claim 1 wherein an outward end of the retaining pipe has a reduced diameter for temporarily retaining the workpiece.

6. A welding apparatus as set forth in claim 1 together with means for connecting the welding apparatus to an electrical source for powering the retaining pipe as a welding electrode.

7. A welding apparatus comprising:

a guide cylinder;

a retractable feeding rod axially positioned in the guide cylinder;

a workpiece retaining pipe connected to an outward end of the guide cylinder;

a feed-in passage for supplying workpieces to the guide cylinder and positioned at an acute angle with respect to the guide cylinder to form an intersection therewith;

the feed-in passage communicating with an interior of the guide cylinder, the feed-in passage further having a) control surface extending from an internal wall of the feed-in passage, at an intermediate section thereof, for intercepting a supplied workpiece and arresting its motion prior to entering the retaining pipe; and b) an opening formed in the guide cylinder at the intersection to allow passage of a workpiece therein from the feed-in passage.

8. A welding apparatus as set forth in claim 7 wherein the feed-in passage includes a plurality of non-linear sections; and further wherein the control surface means are located between two adjacent sections.

9. A welding apparatus as set forth in claim 7 further wherein the control surface means is located in a section of the feed-in passage that is proximate the opening formed in the guide cylinder.

10. A welding apparatus as set forth in claim 7 wherein the feed-in passage includes a plurality of non-linear sections;

further wherein the control surface means are located between two adjacent sections; and still further wherein a retractable member is located near the opening formed in the guide cylinder for gating entry of the workpiece into the retaining pipe, after passage from the control surface.

11. A welding apparatus as set forth in claim 7 together with means for connecting the welding apparatus to an electrical source for powering the, retaining pipe as a welding electrode.

12. A welding apparatus comprising:

a guide cylinder;

a retractable feeding rod axially positioned in the guide cylinder;

a workpiece retaining pipe connected to an outward end of the guide cylinder;

a feed-in passage for supplying workpieces to the guide cylinder and positioned at an acute angle with respect to the guide cylinder to form an intersection therewith;

the feed-in passage communicating with an interior of the guide cylinder, the feed-in passage further having a) an opening formed in the guide cylinder at the intersection to allow passage of a workpiece therein from the feed-in passage; and b) a control surface extending from an internal wall of the feed-in passage, adjacent the opening, for intercepting a supplied workpiece and arresting its motion prior to entering the retaining pipe.

* * * * *